(12) United States Patent
Faruque et al.

(10) Patent No.: US 10,471,919 B2
(45) Date of Patent: Nov. 12, 2019

(54) VEHICLE AIRBAG SYSTEM

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/656,106

(22) Filed: Jul. 21, 2017

(65) Prior Publication Data
US 2019/0023213 A1  Jan. 24, 2019

(51) Int. Cl.
| | | |
|---|---|---|
| *B60R 21/207* | (2006.01) | |
| *B60R 21/203* | (2006.01) | |
| *B60R 21/205* | (2011.01) | |
| *B60R 21/231* | (2011.01) | |
| *B60R 21/2338* | (2011.01) | |

(Continued)

(52) U.S. Cl.
CPC .......... *B60R 21/207* (2013.01); *B60R 21/203* (2013.01); *B60R 21/205* (2013.01); *B60R 21/231* (2013.01); *B60R 21/2338* (2013.01); *B60R 21/0136* (2013.01); *B60R 21/2165* (2013.01); *B60R 2021/01013* (2013.01); *B60R 2021/01034* (2013.01); *B60R 2021/01231* (2013.01); *B60R 2021/01286* (2013.01); *B60R 2021/161* (2013.01); *B60R 2021/23107* (2013.01); *B60R 2021/23146* (2013.01); *B60R 2021/23161* (2013.01); *B60R 2021/23382* (2013.01); *B60R 2021/23386* (2013.01);

(Continued)

(58) Field of Classification Search
CPC ... B60R 21/207; B60R 21/203; B60R 21/205; B60R 21/2338
See application file for complete search history.

(56) References Cited

U.S. PATENT DOCUMENTS 5,251,931 A  * 10/1993 Semchena ............. B60R 21/207
  280/730.1
5,564,736 A  * 10/1996 Kim ........................ B60R 21/02
  280/730.2

(Continued)

FOREIGN PATENT DOCUMENTS

CN   205997843 U   3/2017
JP   2013124063 A  6/2013

OTHER PUBLICATIONS

Heudorfer et al., "Protection System for Far-Side Occupants in Lateral Crashes", Takata-Petri AG, Germany, Paper No. 09-0295, 2009.

(Continued)

*Primary Examiner* — Faye M Fleming
(74) *Attorney, Agent, or Firm* — Frank A. MacKenzie; Bejin Bieneman PLC

(57) ABSTRACT

An airbag system includes a first seat including a seat bottom. The airbag system includes an instrument panel. The airbag system includes a first airbag supported by the seat bottom and inflatable to an inflated position. The airbag system includes a pair of front airbags supported by the instrument panel and inflatable to inflated positions. The first airbag in the inflated position extends from the first seat to between the pair of front airbags in the inflated positions.

18 Claims, 9 Drawing Sheets

(51) Int. Cl.
*B60R 21/0136* (2006.01)
*B60R 21/2165* (2011.01)
*B60R 21/01* (2006.01)
*B60R 21/16* (2006.01)
*B60R 21/235* (2006.01)

(52) U.S. Cl.
CPC ............... *B60R 2021/23523* (2013.01); *B60R 2021/23542* (2013.01)

(56) References Cited

U.S. PATENT DOCUMENTS

| | | | |
|---|---|---|---|
| 5,575,497 A | 11/1996 | Kouichi et al. | |
| 7,549,672 B2 * | 6/2009 | Sato | B60R 21/207 |
| | | | 280/729 |
| 7,717,459 B2 | 5/2010 | Bostrom et al. | |
| 7,802,809 B2 | 9/2010 | Ryan et al. | |
| 8,684,408 B2 | 4/2014 | Thomas et al. | |
| 8,882,138 B1 | 11/2014 | Hicken et al. | |
| 9,056,592 B1 | 6/2015 | Kline | |
| 9,233,661 B2 * | 1/2016 | Yamanaka | B60R 21/18 |
| 9,358,943 B2 | 6/2016 | Borjeson et al. | |
| 9,463,763 B2 * | 10/2016 | Watamori | B60R 21/23138 |
| 9,493,135 B2 * | 11/2016 | Fukawatase | B60R 21/214 |
| 9,566,882 B2 * | 2/2017 | Mihm | B60R 21/231 |
| 9,598,042 B2 * | 3/2017 | Schneider | B60R 21/231 |
| 9,650,011 B1 * | 5/2017 | Belwafa | B60R 21/233 |
| 9,925,949 B2 * | 3/2018 | Mihm | B60R 21/23138 |
| 9,981,624 B2 | 5/2018 | Perlo et al. | |
| 9,994,181 B1 * | 6/2018 | Dubaisi | B60R 21/207 |
| 2008/0106128 A1 | 5/2008 | Kashiwagi | |
| 2015/0375706 A1 | 12/2015 | Jaradi et al. | |
| 2016/0039385 A1 | 2/2016 | Watamori et al. | |
| 2016/0082915 A1 * | 3/2016 | Madaras | B60R 21/231 |
| | | | 297/216.2 |
| 2016/0325707 A1 | 11/2016 | Morozini de Lira | |
| 2017/0072893 A1 | 3/2017 | Fujiwara | |

OTHER PUBLICATIONS

Search Report form United Kingdom Intellectual Property Office dated Dec. 14, 2018 regarding Application No. GB1810461.2 (5 pages).

Non-Final Office Action dated Nov. 2, 2018 regarding U.S. Appl. No. 15/634,038 (18 pages).

* cited by examiner

VEHICLE AIRBAG SYSTEM

BACKGROUND

Vehicles may include a variety of airbags deployable during vehicle impacts to absorb energy from occupants of the vehicles during the impact. The airbag may be a component of an airbag assembly including a housing supporting the airbag, and an inflation device in communication with the airbag for inflating the airbag from an uninflated position to an inflated position. The airbag assemblies may be supported on a steering wheel of the vehicle, an instrument panel of the vehicle, etc.

DETAILED DESCRIPTION

Figure 1:
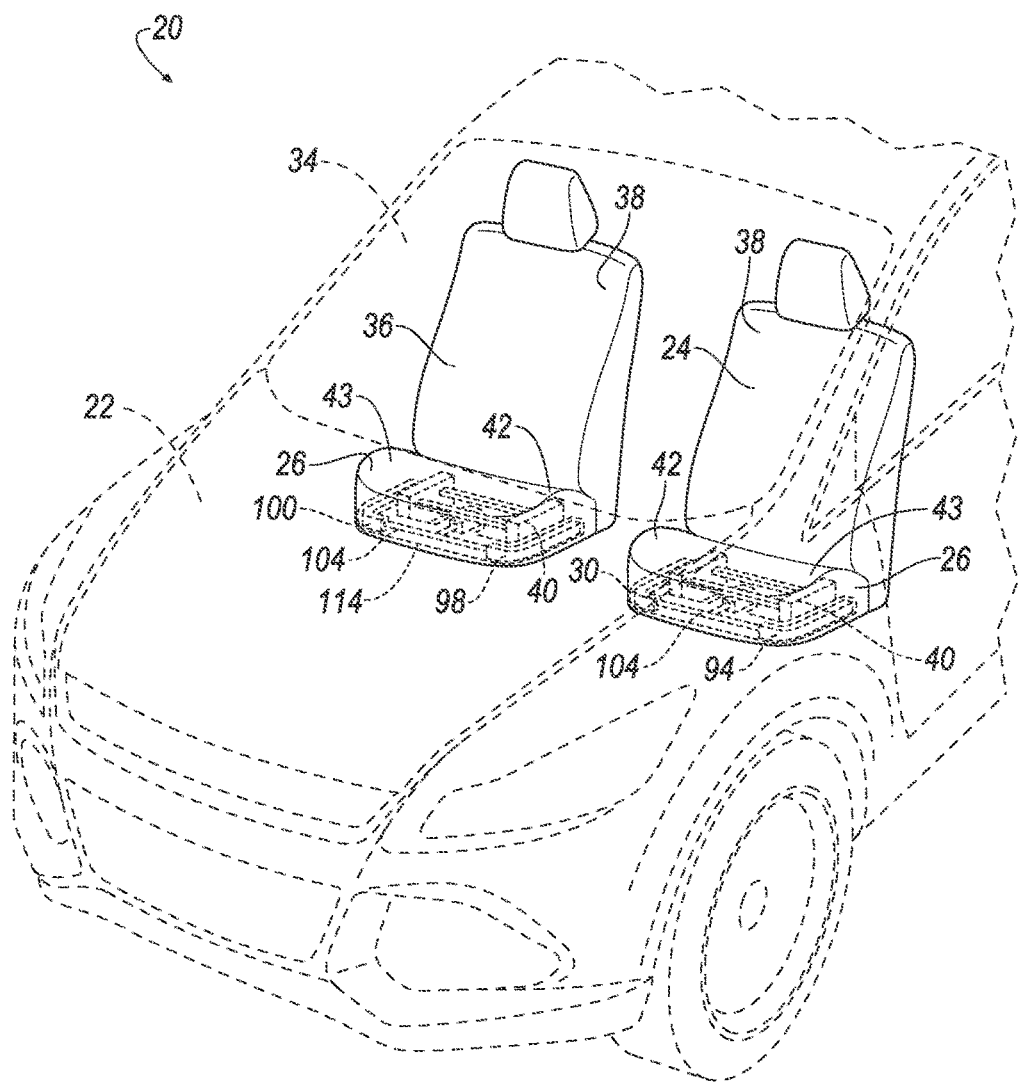
FIG. 1 is a front side perspective view of a vehicle including an airbag system with airbags of the airbag system in uninflated positions.
Figure 2:
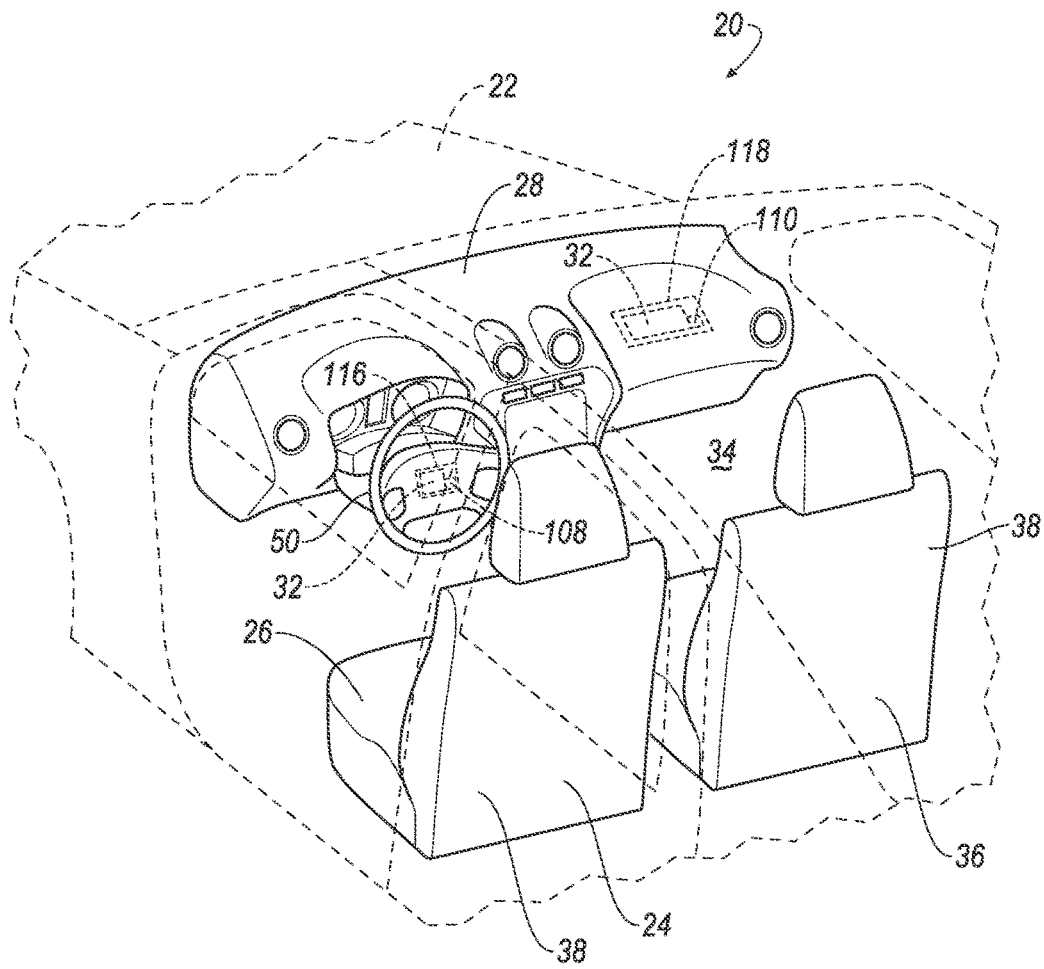
FIG. 2 is a rear side perspective view of the vehicle including the airbag system with the airbags in the uninflated positions.
Figure 3:
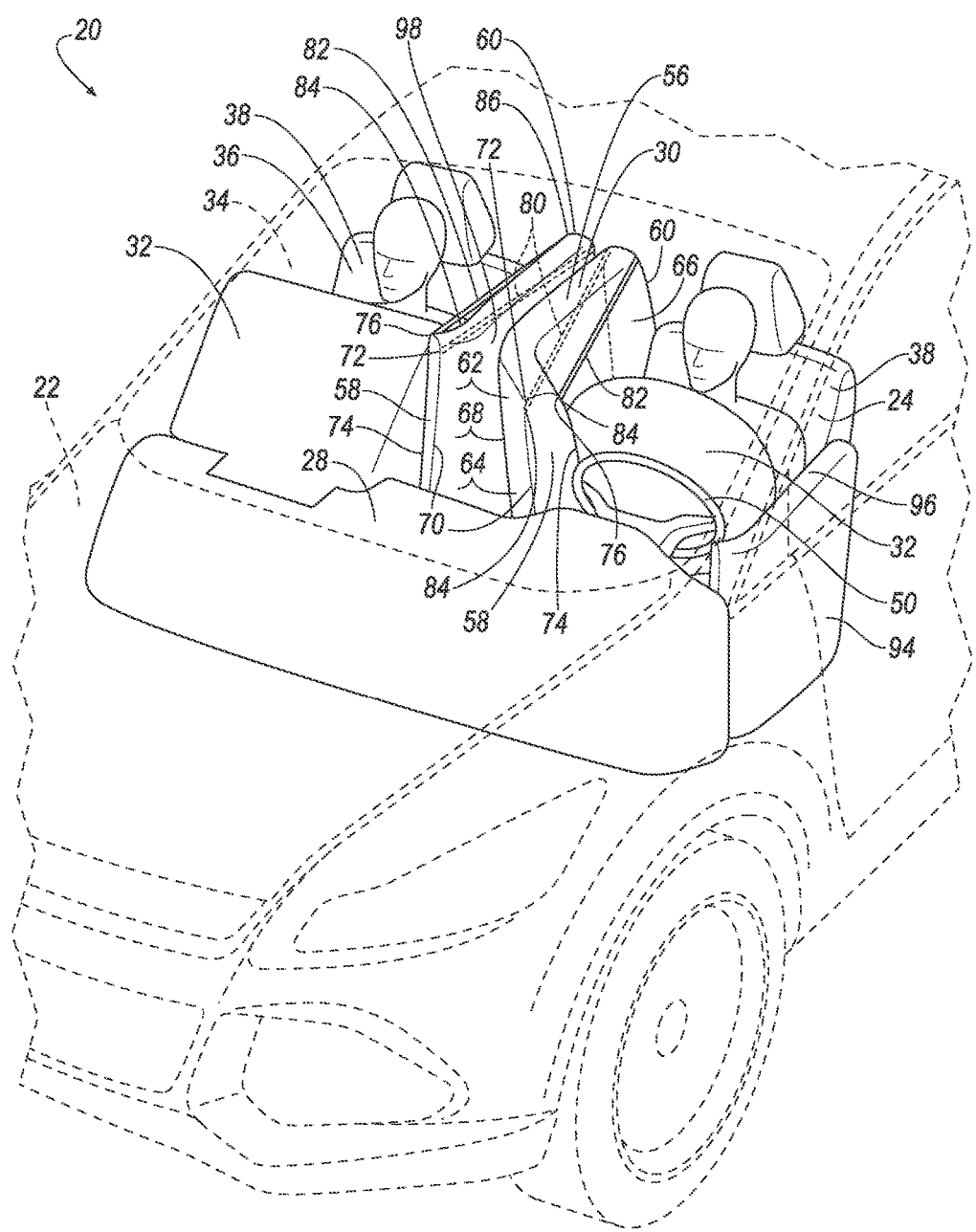
FIG. 3 is a perspective view of the vehicle including the airbag system with the airbags of the airbag system in inflated positions.
Figure 4:
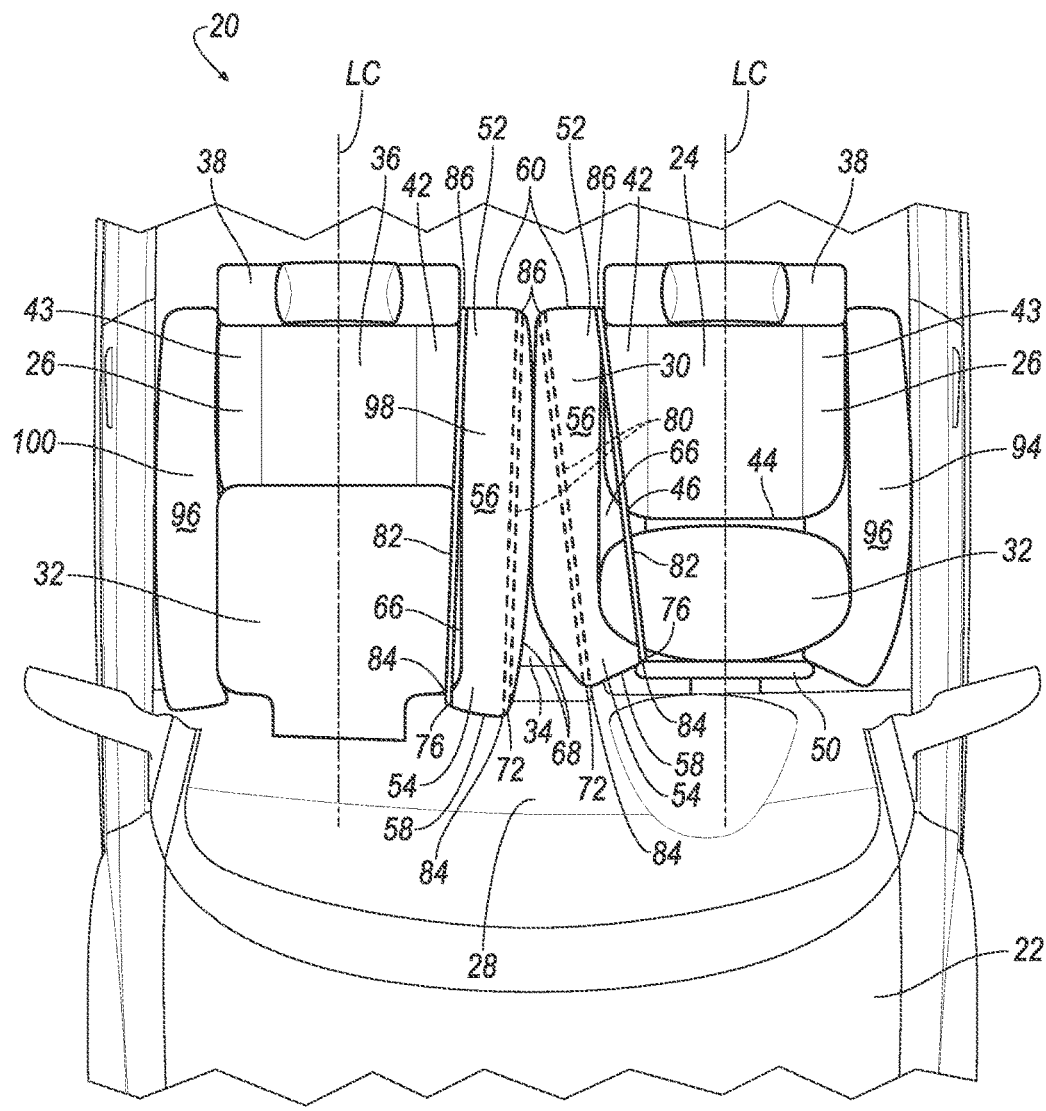
FIG. 4 is a top view of the vehicle including the airbag system with airbags of the airbags system in the inflated positions.
Figure 5:
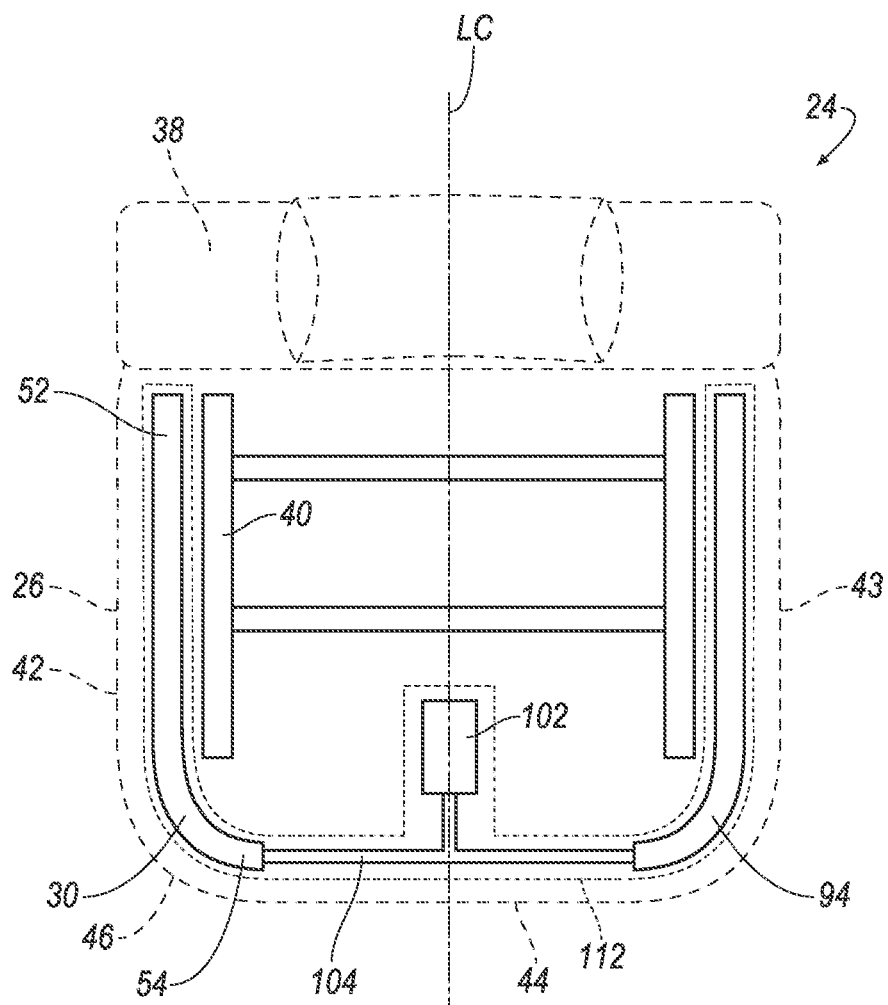
FIG. 5 is a top view of a seat of the airbag system.

An airbag system includes a first seat including a seat bottom. The airbag system includes an instrument panel. The airbag system includes a first airbag supported by the seat bottom and inflatable to an inflated position. The airbag system includes a pair of front airbags supported by the instrument panel and inflatable to inflated positions. The first airbag in the inflated position extends from the first seat to between the pair of front airbags in the inflated positions.

The instrument panel may include a steering wheel and one of the pair of front airbags may be supported by the steering wheel.

The seat bottom may include a side, a front, and a curved portion extending from the side to the front, the first airbag extending along the side and curving along the curved portion.

The first airbag in the inflated position may curve between the instrument panel and one of the pair of front airbags.

The first airbag may include a first end on the side of the seat bottom and a second end on the front of the seat bottom.

The airbag system may include a tether connected to the second end.

The first airbag may define an inflation chamber, and the tether may be disposed in the inflation chamber.

The first airbag in the inflated position may include a curved portion at the second end, the curved portion may have an outer corner at the second end, and the tether may be connected to the outer corner.

The first airbag may define an inflation chamber, and the tether may be disposed outside of the inflation chamber.

The first airbag in the inflated position may include a curved portion at the second end, the curved portion may have an inner corner, and the tether may be connected to the inner corner.

The first airbag in the inflated positon may abut at least one of the pair of front airbags in the inflated positions.

The airbag system may include a second airbag being inflatable to an inflated position, the seat bottom may include a first side and a second side opposite the first side, the first airbag may be supported on the first side and the second airbag may be supported on the second side.

The airbag system may include an inflator in fluid communication with the first airbag and the second airbag.

The first airbag and the second airbag in the inflated positions may each have a distal end spaced upwardly from the seat bottom. A distance from the seat bottom to the distal end of the first airbag may be greater than a distance from the seat bottom to the distal end of the second airbag.

The airbag system may include a computer programmed to actuate inflation of the first airbag. The computer may be programmed to actuate inflation of at least one of the pair of front airbags at a predetermined amount of time after the actuation of the first airbag.

The airbag system may include a deflector supported by the seat bottom, the deflector configured to deflect the first airbag upwardly as the first airbag inflates.

The airbag system may include a hinge and a stop, the stop limiting a range of motion of the hinge, the deflector supported on the seat bottom with the hinge.

The first seat may include a seat back. The first airbag in the inflated position may abut the seat back and the instrument panel.

The airbag system may include a second seat including a seat bottom, an airbag supported by the seat bottom of the second seat and being inflatable to an inflated position, the airbag of the second seat in the inflated position extending from the second seat to between the pair of front airbags in the inflated positions.

In the inflated positions the first airbag of the first seat may abut the airbag of the second seat, the first airbag of the first seat may abut one of the pair of front airbags, and the airbag of the second seat may abut the other of the pair of front airbags.

With reference to the Figures, wherein like numerals indicate like parts throughout the several views, an airbag system 20 in a vehicle 22 includes a first seat 24. The first seat 24 includes a seat bottom 26. The airbag system 20 includes an instrument panel 28. The airbag system 20 includes a first airbag 30 supported by the seat bottom 26 of the first seat 24. The first airbag 30 is inflatable to an inflated position. The airbag system 20 includes a pair of front airbags 32. Each of the front airbags 32 are supported by the instrument panel 28. Each of front airbags 32 are inflatable to an inflated position. The first airbag 30 in the inflated position extends from the first seat 24 to between the pair of front airbags 32 in the inflated positions.

The airbag system 20 mitigates head, neck and chest injuries in frontal offset and oblique impacts of the vehicle 22. For example, the airbag system 20 may mitigate head contact between a driver and a passenger during rebounding or roll-over events of the vehicle 22. The airbag system 20 provides multidirectional protection, e.g., the first airbag 20 works in combination with the front airbags 32 to reduce head injury criteria (HIC), brain injury criteria (BrIC), and/or neck injury criteria.

The vehicle 22, shown in FIGS. 1-4, 9 and 10, may be any passenger or commercial automobile such as a car, a truck, a sport utility vehicle, a crossover vehicle, a van, a minivan, a taxi, a bus, etc. The vehicle 22 may include a passenger cabin 34.

The vehicle 22 may include a plurality of seats, e.g., the first seat 24 and a second seat 36, in the passenger cabin 34. The first seat 24 and the second seat 36 may be front seats, as shown in the Figures. For example, the first seat 24 may be a front driver seat, and the second seat 36 may be a front passenger seat.

With reference to FIGS. 1-9, each of the seats 24, 36 includes the seat bottom 26. Each of the seats 24, 36 may include a seat back 38. Each of the seats 24, 36 may include a seat frame 40. The seats 24, 36 may each define a longitudinal centerline LC.

The seat frame 40 may include tubes, beams, etc. The seat frame 40 may be formed of any suitable plastic material, e.g., carbon fiber reinforced plastic (CFRP), glass fiber-reinforced semi-finished thermoplastic composite (organosheet), etc.

The seat bottom 26 includes a first side 42 and a second side 43 opposite the first side 42. The seat bottom 26 may include a front 44 extending between the first side 42 and the second side 43. The seat bottom 26 may include curved portions 46. One of curved portions 46 may extend from the first side 42 to the front 44, and the other of the curved portions 46 may extend from the second side 43 to the front 44.

The seat back 38 may be supported by the seat bottom 26 and may be stationary or movable relative to the seat bottom 26.

Figure 7:
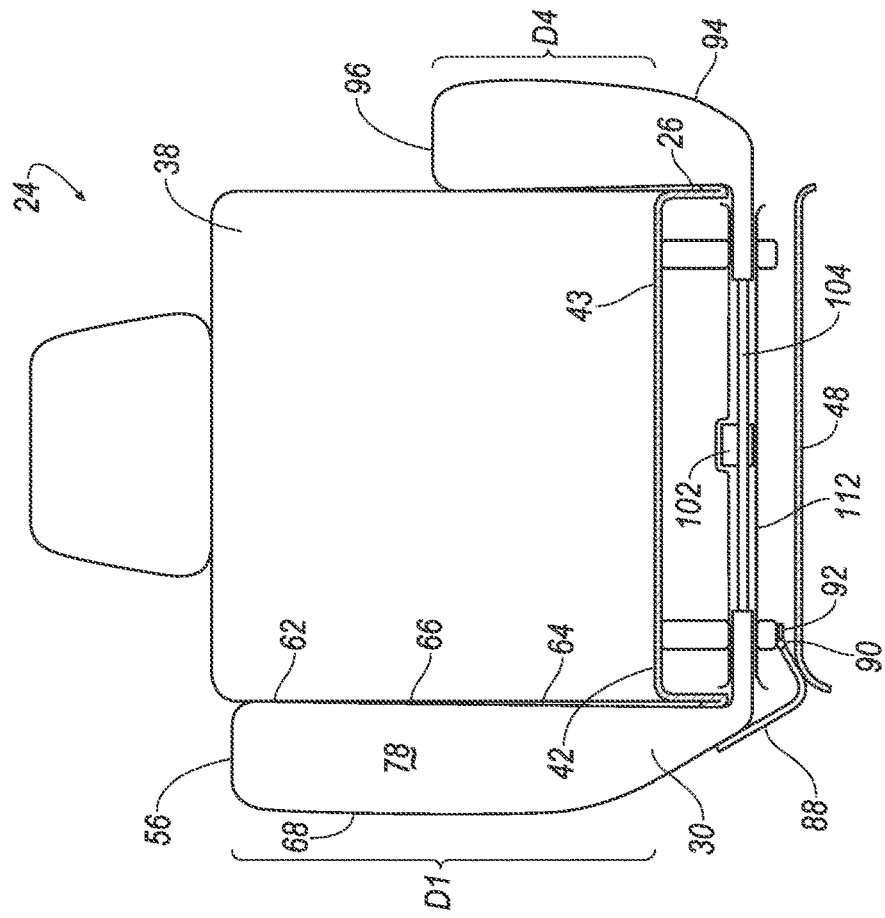
FIG. 7 is a front cross section of the seat of the airbag system with airbags of the airbags system in the inflated positions.
Figure 6:
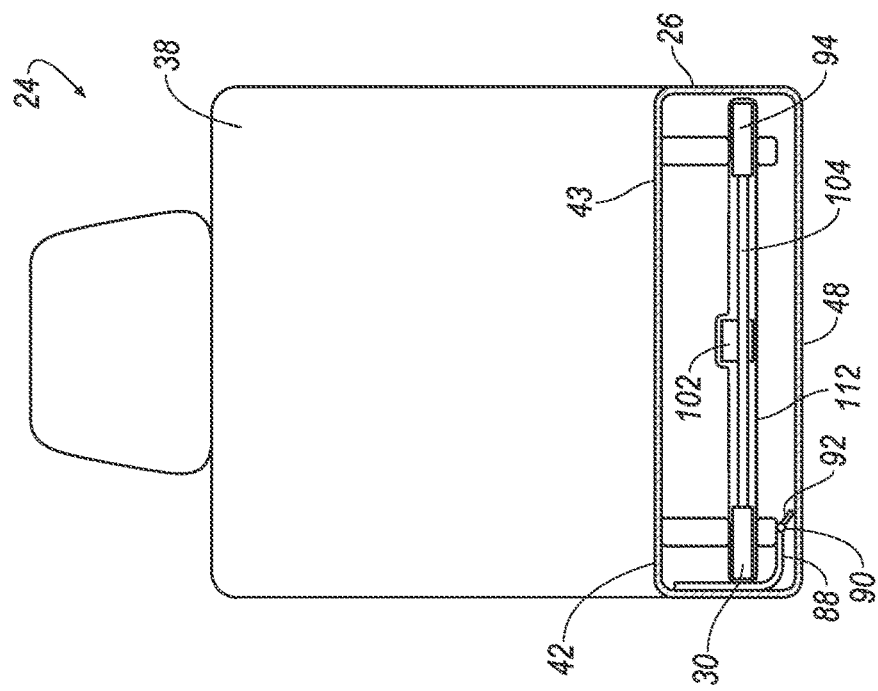
FIG. 6 is a front cross section of the seat of the airbag system.
Figure 8:
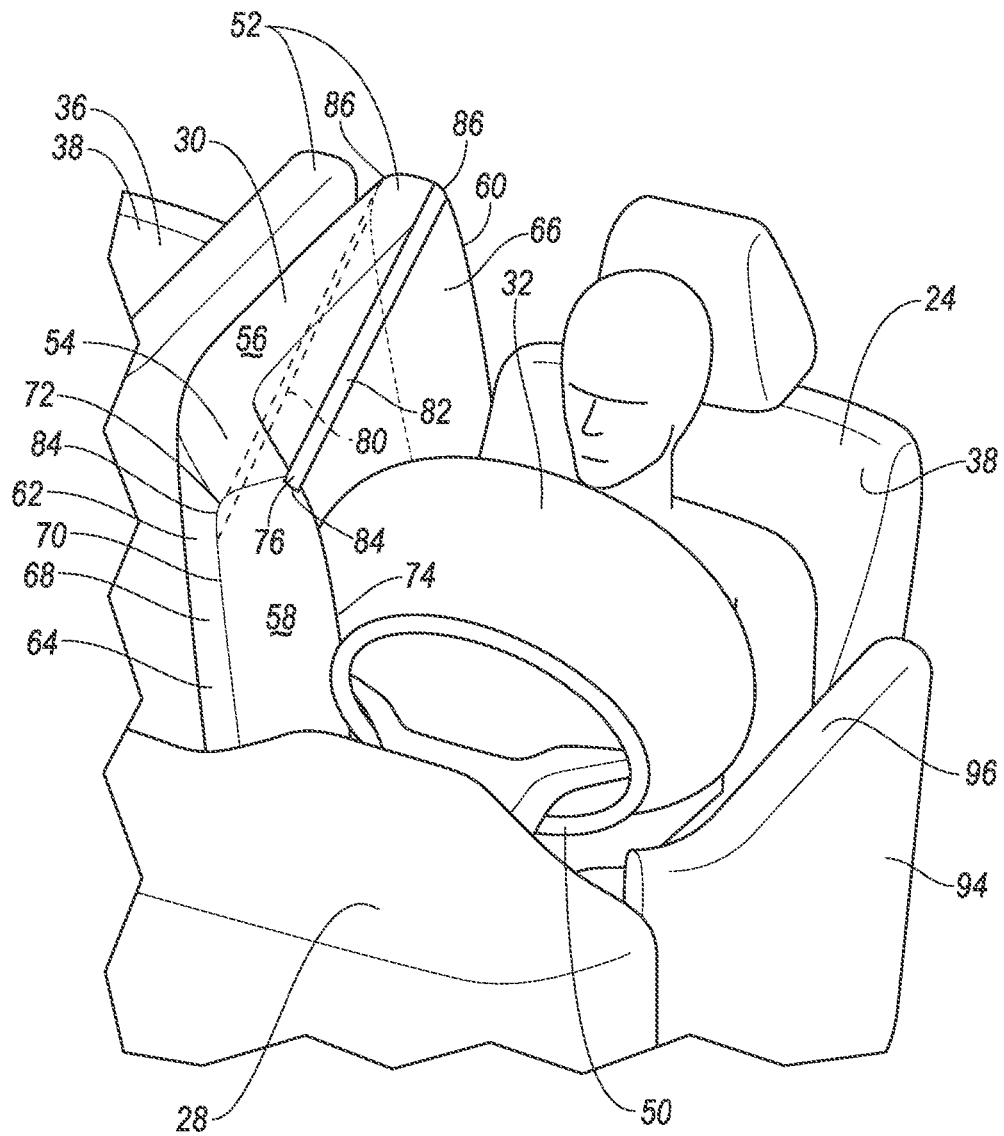
FIG. 8 is a perspective view of the seat and an instrument panel with airbags of the airbags system in the inflated positions.

The seat bottom 26 and seat back 38 may include a cover 48, as shown in FIGS. 6 and 7. The cover 48 may include upholstery and padding. The upholstery may be formed of cloth, leather, faux leather, or any other suitable material. The upholstery may be stitched in panels around the frame. The padding may be between the cover 48 and the frame, and may be foam or any other suitable material. The cover 48 may separate, tear, etc., e.g., upon inflation of the first seat 24 first airbag 30.

As shown in FIGS. 1-4 and 9, the instrument panel 28 may be disposed in the passenger cabin 34 and face toward the seats 24, 36. The instrument panel 28 may include vehicle 22 controls. The instrument panel 28 may include a steering wheel 50.

Each of the pair of front airbags 32 is supported by the instrument panel 28. Each of the front airbags 32 are inflatable from an uninflated position to an inflated position. One of the front airbags 32 of the pair of front airbags 32 may be supported by the steering wheel 50. In other words, one of the front airbags 32 may be a driver airbag. The other of the front airbags 32 may be a passenger airbag. The front airbags 32 may be circular, rectangular, or any other shape.

Returning to FIGS. 1-9, in addition to the first airbag 30 and the front airbags 32, the airbag system 20 may include another first airbag 98 and second airbags 94, 100. The first airbag 98 and the second airbag 100 are supported by the second seat 36. The second airbag 94 is supported by the first seat 24.

The airbags 30, 32, 94, 98, 100 may be formed of a woven polymer or any other material. As one example, the airbags 30, 32, 94, 98, 100 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The first airbags 30, 98 are supported by the seat bottom 26 of their respective seat 24, 36, i.e., the first airbag 30 is supported by the seat bottom 26 of the first seat 24, and the first airbag 98 is supported by the seat bottom 26 of the second seat 36. The first airbags 30, 98 may be supported on the first side 42 of the seat bottom 26. Each of the first airbags 30, 98 may include a first end 52. Each of the first airbags 30, 98 may include a second end 54. The first end 52 is on the first side 42 of the seat bottom 26. The second end 54 is on the front 44 of seat bottom 26.

The first airbags 30, 98 are inflatable to inflated positions, e.g., from uninflated positions. Each of the first airbags 30, 98 in the inflated position may include a top distal end 56. Each of the first airbags 30, 98 in the inflated positon may include a front distal end 58 and a rear distal end 60. The front distal end 58 is spaced from the rear distal end 60. The top distal end 56, the front distal end 58, and the rear distal end 60 may be flat or rounded. Each of the first airbags 30, 98 in the inflated position may include a top portion 62 and a bottom portion 64. As used herein, top, bottom, front, and rear are from the perspective of an occupant of the respective seat 24, 36.

The top distal end 56 is spaced upwardly from the seat bottom 26. The distal ends 56 of each of the first airbags 30, 98 in the inflated position are spaced a distance D1 from their respective seat bottom 26, as shown in FIG. 7 for the first airbag 30.

Figure 9:
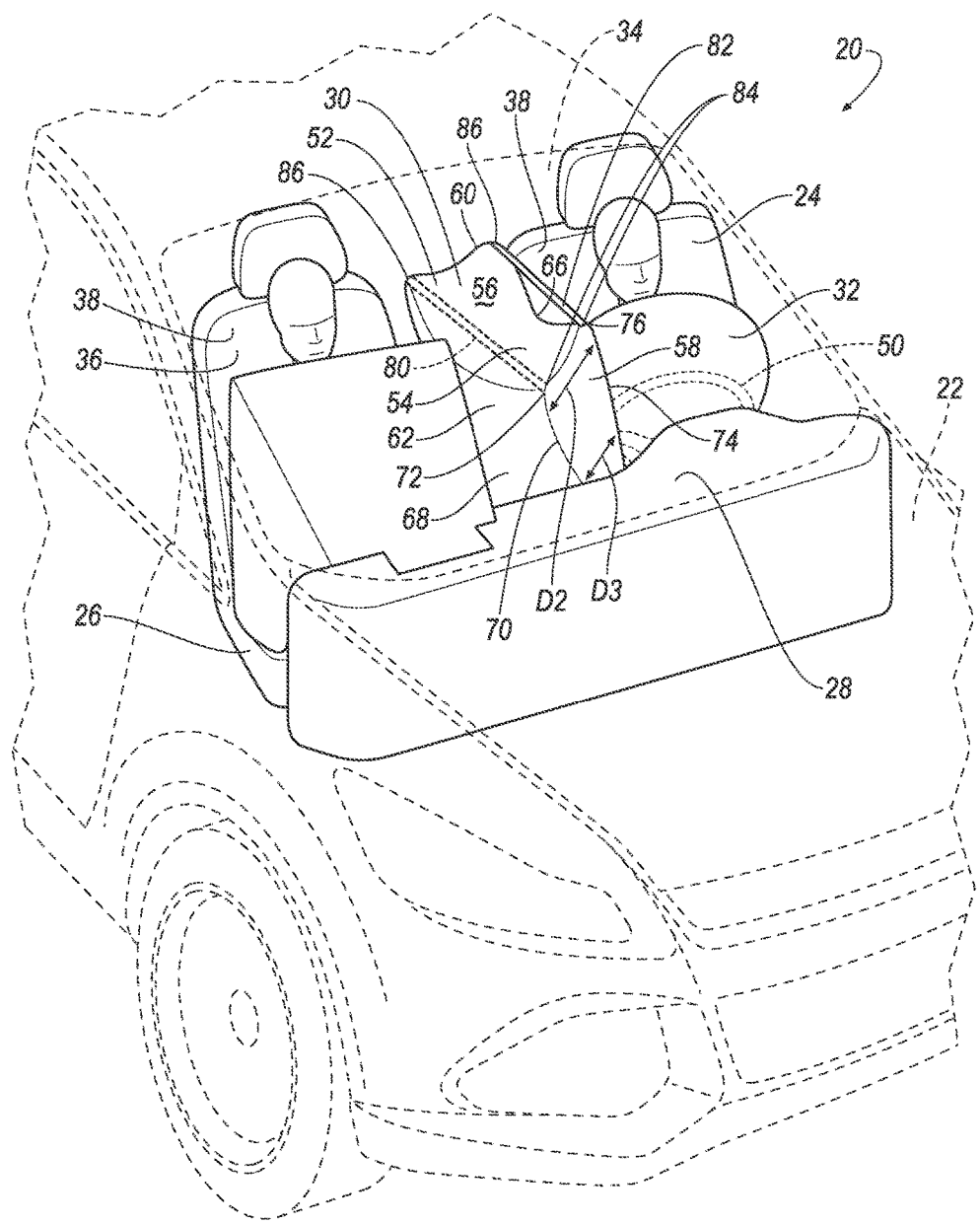
FIG. 9 is a perspective view of the vehicle including another example embodiment of the airbag system with the airbags system in inflated positions.

Each of the first airbags 30, 98 may include an inner panel 66 and an outer panel 68. The inner panel 66 is spaced from the outer panel 68 in the inflated position. As shown in FIG. 9 for the first airbag 30, the inner panel 66 may be spaced from the outer panel 68 by a distance D2 at the top portion 62 in the inflated position. The inner panel 66 may be spaced from the outer panel 68 by a distance D3 at the bottom portion 64 in the inflated position. The distance D2 at the top portion 62 may be greater than the distance D3 at the bottom portion 64. The inner panel 66 and the outer panel 68 may extend between the top distal end 56, the front distal end 58, and the rear distal end 60. As used herein, inner and outer are from the perspective of the occupant of the respective seat 24, 36.

Each of the first airbags 30, 98 may have a curved shape. The first airbags 30, 98 may be parallel to the first side 42 of their respective seat bottom 26 at the first ends 52. The first airbags 30, 98 may curve towards the longitudinal centerline LC of their respective seat bottom 26 at the second ends 54.

Each of the first airbags 30, 98 in the inflated position curves to an outer edge 70 at the second end 54. The outer edge 70 may be located where the outer panel 68 meets the front distal end 58.

Each of the first airbags 30, 98 in the inflated position curves to an outer corner 72 of at the second end 54. The outer corner 72 may be located where the outer panel 68 meets the top distal end 56 and the front distal end 58.

Each of the first airbags 30, 98 in the inflated position curves to an inner edge 74 at the second end 54. The inner edge 74 may be located where the inner panel 66 meets the front distal end 58.

Each of the first airbags 30, 98 in the inflated position curves to an inner corner 76 at the second end 54. The inner corner 76 may be located where the inner panel 66 meets the top distal end 56 and the front distal end 58.

Each of the first airbags 30, 98 defines an inflation chamber 78, as shown in FIG. 7 for the first airbag 30. The inflation chamber 78 may be between the inner panel 66 and the outer panel 68.

Each of the first airbags 30, 98 in the inflated position extends from the respective seat 24, 36 to between the pair of front airbags 32 in the inflated positions. In the inflated position the second end 54 may be disposed between the pair of front airbags 32 in the inflated positions. The front distal end 58 may be disposed between the pair of front airbags 32 in the inflated positions.

Each of the first airbags 30, 98 in the inflated position may abut the seat back 38 of the respective seat 24, 36 and the instrument panel 28. In the inflated position the first end 52 may abut the seat back 38. The rear distal end 60 may abut the seat back 38. In the inflated position the second end 54 may abut the instrument panel 28. The front distal end 58 may abut the instrument panel 28. The outer panel 68 may abut the instrument panel 28.

The first airbag 30 of the first seat 24 in the inflated position may abut the steering wheel 50. The second end 54 may abut the steering wheel 50. The front distal end 58 may abut the steering wheel 50.

Each of the first airbags 30, 98 in the inflated positon may abut at least one of the front airbags 32 of the pair of front airbags 32 in the inflated position. The second end 54 may abut one of the pair of front airbags 32. The inner panel 66 may abut one of the pair of front airbags 32.

The first airbag 30 of the first seat 24 may abut both of the front airbags 32, as shown in FIG. 9. The inner panel 66 may abut one front airbag 32 of the pair of front airbags 32. The outer panel 68 may abut the other front airbag 32 of the pair of front airbags 32.

Each of the first airbags 30, 98 may extend along the first side 42 of the seat bottom 26, curving along the curved portion 46.

Each of the first airbags 30, 98 in the inflated position may curve between the instrument panel 28 and one of the front airbags 32 of the pair of front airbags 32. In the inflated position the second end 54 may be disposed between the instrument panel 28 and one of the front airbags 32 of the pair of front airbags 32. The front distal end 58 may be disposed between the instrument panel 28 and one of the front airbags 32 of the pair of front airbags 32.

Each of the first airbags 30, 98 may include a first tether 80 and a second tether 82. The tethers 80, 82 assists in shaping the airbags 30, 98 in the inflated positions, e.g., in having the curved shape. Each of the tethers 80, 82 may include a first end 84 and a second end 86. The first end 84 may be spaced from the second end 86. The tethers 80, 82 may extend from the first end 84 to the second end 86. The tethers 80, 82 may be made of a same type of material as airbags 30, 98.

The tethers 80, 82 may be connected to the second end 54. The first end 84 of the tethers 80, 82 may be connected the second end 54. The second end 86 may be connected to the first end 52, the inner panel 66, the outer panel 68, the rear distal end 60, etc.

The first tether 80 may be disposed in the inflation chamber 78. The first tether 80 may be disposed between the inner panel 66 and the outer panel 68.

The first tether 80 may be connected to the outer edge 70. The first end 84 of the first tether 80 may be connected to the outer edge 70. The first end 84 of the first tether 80 may be connected to the outer panel 68 where the outer panel 68 meets the front distal end 58. The first end 84 of the first tether 80 may be connected to the front distal end 58 where the front distal end 58 meets the outer panel 68. The first end 84 of the first tether 80 may be connected to both the outer panel 68 and the front distal end 58 where the front distal end 58 meets the outer panel 68.

The first tether 80 may be connected to the outer corner 72. The first end 84 of the first tether 80 may be connected to the outer corner 72. The first end 84 of the first tether 80 may be connected to the top distal end 56 where the top distal end 56 meets the outer panel 68 and the front distal end 58. The first end 84 of the first tether 80 may be connected to the front distal end 58 where the front distal end 58 meets the outer panel 68 and the top distal end 56. The first end 84 of the first tether 80 may be connected to the outer panel 68 where the outer panel 68 meets the top distal end 56 and the front distal end 58. The first end 84 of the first tether 80 may be connected to a combination of the front distal end 58, the top distal end 56, and/or the outer panel 68 where the front distal end 58, the top distal end 56, and the outer panel 68 meet.

The second tether 82 may be disposed outside of the inflation chamber 78. The second tether 82 may be disposed other than between the inner panel 66 and the outer panel 68.

The second tether 82 may be connected to the inner edge 74. The first end 84 of the second tether 82 may be connected to the inner edge 74. The first end 84 of the second tether 82 may be connected to the inner panel 66 where the inner panel 66 meets the front distal end 58. The first end 84 of the second tether 82 may be connected to the front distal end 58 where the front distal end 58 meets the inner panel 66. The first end 84 of the second tether 82 may be connected to both the inner panel 66 and the front distal end 58 where the front distal end 58 meets the inner panel 66.

The second tether 82 may be connected to the inner corner 76. The first end 84 of the second tether 82 may be connected to the inner corner 76. The first end 84 of the second tether 82 may be connected to the top distal end 56 where the top distal end 56 meets the inner panel 66 and the front distal end 58. The first end 84 of the second tether 82 may be connected to the front distal end 58 where the front distal end 58 meets the inner panel 66 and the top distal end 56. The first end 84 of the second tether 82 may be connected to the inner panel 66 where the inner panel 66 meets the top distal end 56 and the front distal end 58. The first end 84 of the second tether 82 may be connected to a combination of the front distal end 58, the top distal end 56, and/or the inner panel 66 where the front distal end 58, the top distal end 56, and the inner panel 66 meet.

The airbag system 20 may include a deflector 88. The deflector 88 may be supported by the seat bottom 26. The deflector 88 may be supported by the seat frame 40. The deflector 88 may be disposed underneath the cover 48.

The deflector 88 may be configured to deflect the first airbag 30 or the first airbag 98 upwardly as the first airbag 30 or the first airbag 98 inflates, e.g., depending on whether the deflector 88 is supported by the first seat 24 or the second seat 36. The deflector 88 may have an arcuate shape extending from under the seat bottom 26 to along the first side 42 of the seat bottom 26.

The airbag system 20 may include a hinge 90. The deflector 88 may be supported on the seat bottom 26 with the hinge 90. The hinge 90 allows pivotal movement of the deflector 88 relative to the seat bottom 26. The hinge 90 may be secured to the deflector 88 and the seat frame 40.

The airbag system 20 may include a stop 92. The stop 92 limits a range of motion of the hinge 90. For example, the stop 92 may be secured to the hinge 90 and abut the seat bottom 26 when the deflector 88 is pivoted about the hinge 90. The stop 92 may abut the seat frame 40.

The second airbags 94, 100 may be supported on the second side 43 of the seat bottom 26 of their respective seat 24, 36. The second airbags 94, 100 are inflatable to inflated positions, e.g., from uninflated positions. Each of the second airbags 94, 100 in the inflated position has a top distal end 96 spaced upwardly from the seat bottom 26. The top distal ends 96 of second airbags 94, 100 in the inflated positions are spaced a distance D4 from the seat bottom 26, as shown in FIG. 7 for the second airbag 94. The distance D1, e.g., from the seat bottom 26 to the top distal end 56 of the first airbag 30, is greater than the distance D4, e.g., from the seat bottom 26 to the top distal end 96 of the second airbag 94.

In the inflated positions the first airbag 30 of the first seat 24 may abut the first airbag 98 of the second seat 36. The outer panel 68 of the first airbag 30 may abut the outer panel 68 of first airbag 98. The first airbag 30 of the first seat 24 may abut one of the pair of front airbags 32. The first airbag 98 of the second seat 36 may abut the other of the pair of front airbags 32.

With refence to FIG. 1-10, The airbag system 20 may include a first inflator 102. The first inflator 102 may be in fluid communication with the first airbag 30 of the first seat 24 and the second airbag 94 of the first seat 24. For example, the first inflator 102 may inflate the first airbag 30 and the second airbag 94 via a fill tube 104. The airbag system 20 may include a second inflator 106. The second inflator 106 may be in fluid communication with the first airbag 98 of the second seat 36 and the second airbag 100 of the second seat 36, e.g., via another fill tube 104. The airbag system 20 may include a third inflator 108. The third inflator 108 may be in fluid communication with one of the pair of front airbags 32. The airbag system 20 may include a fourth inflator 110. The fourth inflator 110 may be in fluid communication with the other front airbag 32 of the pair of front airbags 32.

The inflators 102, 106, 108, 110 may be, for example, pyrotechnic inflators that use a chemical reaction to drive inflation medium to the airbags 30, 32, 94, 98, 100. The inflators 102, 106, 108, 110 may be of any suitable type, for example, a cold-gas inflator.

The airbag system 20 may include a first housing 112. The first inflator 102, the first airbag 30 of the first seat 24 in the uninflated position, and the second airbag 94 of the first seat 24 in the uninflated position may be disposed in the first housing 112. The airbag system 20 may include a second housing 114. The second inflator 106, the first airbag 98 of the second seat 36 in the uninflated position, and the second airbag 100 of the second seat 36 in the uninflated position may be disposed in the second housing 114. The airbag system 20 may include a third housing 116. The third inflator 108 and one of the pair of front airbags 32 in the uninflated position may be disposed in the third housing 116. The airbag system 20 may include a fourth housing 118. The fourth inflator 110 and the other front airbag 32 of the pair of front airbags 32 in the uninflated position may be disposed in the fourth housing 118. The airbags 30, 32, 94, 98, 100 may be rolled and/or folded to fit in the housings 112, 114, 116, 118.

The housings 112, 114, 116, 118 provide reaction surfaces for the airbags 30, 32, 94, 98, 100 in the inflated positions. The first housing 112 and second housing 114 may each be supported by one of the seat bottoms 26. The third housing 116 and the fourth housing 118 may each be supported by the instrument panel 28. The third housing 116 or the fourth housing 118 may be supported by the steering wheel 50. The housings 112, 114, 116, 118 may be formed of any material, e.g., a rigid polymer, a metal, a composite, etc.

Figure 10:
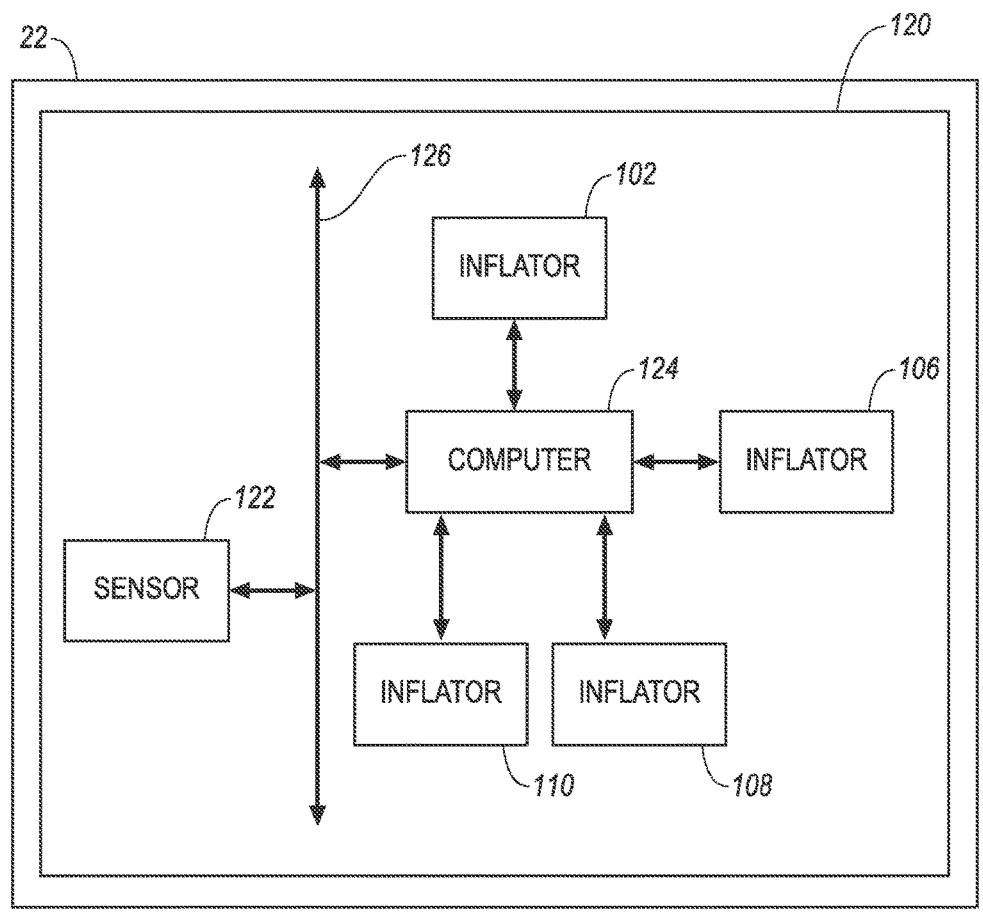
FIG. 10 is a schematic of an impact sensing system of the vehicle.

With refence to FIG. 10 the vehicle 22 includes an impact sensing system 120. The impact sensing system 120 may include at least one impact sensor 122 for sensing impact of the vehicle 22, and a computer 124 in communication with the impact sensor 122 and the inflators 102, 106, 108, 110. The computer 124 may activate the inflators 102, 106, 108, 110, e.g., provide an impulse to a pyrotechnic charge of the inflators 102, 106, 108, 110, when the impact sensor 122 senses an impact of the vehicle 22. Alternatively or additionally to sensing impact, the impact sensing system 120 may be configured to sense impact prior to impact, i.e., pre-impact sensing.

The impact sensor 122 may be in communication with the computer 124. The impact sensor 122 is configured to detect an impact to the vehicle 22. The impact sensor 122 may be of any suitable type, for example, post-contact sensors such as accelerometers, pressure sensors, and contact switches; and pre-impact sensors 122 such as radar, LIDAR, and vision-sensing systems. The vision systems may include one or more cameras, CCD image sensors, CMOS image sensors, etc. The impact sensor 122 may be located at numerous points in or on the vehicle 22.

The computer 124 and the impact sensor 122 may be connected to a communication bus 126, such as a controller area network (CAN) bus, of the vehicle 22. The computer 124 may use information from the communication bus 126 to control the activation of the inflators 102, 106, 108, 110. The inflators 102, 106, 108, 110 may be connected to the computer 124, as shown in FIG. 10, or the inflators 102, 106, 108, 110 may be connected directly to the communication bus 126.

The computer 124 may be a microprocessor-based computer 124 implemented via circuits, chips, or other electronic components. For example, the computer 124 may include a processor, a memory, etc. The memory of the computer 124 may include memory for storing programming instructions executable by the processor as well as for electronically storing data and/or databases.

The computer 124 may be programmed to actuate inflation of the first seat 24 first airbag 30. The computer 124 may be programmed to actuate inflation of at least one of the front airbags 32 of the pair of front airbags 32 at a predetermined amount of time, e.g. 15 milliseconds, after the actuation of the first seat 24 first airbag 30. For example, the computer 124 may be programmed to transmit a signal to the third inflator 108 and/or the fourth inflator 110 at the predetermined amount of time after transmitting a signal to the first inflator 102.

In operation, the airbags 30, 32, 94, 98, 100 of the airbag system 20 are in uninflated positions, as shown in FIGS. 1, 2, 5 and 6, under normal operating conditions of the vehicle 22. In the event of an impact, the impact sensor 122 may detect the impact and transmit a signal through the communication bus 126 to the computer 124. The computer 124 may transmit a signal through the communication bus 126 to each of the inflators 102, 106, 108, 110. Upon receiving the signals, the inflators 102, 106, 108, 110 may discharge and inflate the airbags 30, 32, 94, 98, 100 with the inflation medium from the uninflated positions to the inflated positions.

The adjectives "first" and "second" are used throughout this document as identifiers and are not intended to signify importance or order.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An airbag system comprising:
a first seat including a seat bottom;
an instrument panel;
a first airbag supported by the seat bottom and being inflatable to an inflated position; and
a pair of front airbags supported by the instrument panel and being inflatable to inflated positions; and
the first airbag in the inflated position extending from the first seat to between the pair of front airbags in the inflated positions;
wherein the first airbag in the inflated position abuts at least one of the pair of front airbags in the inflated positions; and
wherein the first airbag in the inflated position curves between the instrument panel and one of the pair of front airbags.

2. The airbag system of claim 1, wherein the instrument panel includes a steering wheel and one of the pair of front airbags is supported by the steering wheel.

3. The airbag system of claim 1, wherein the seat bottom includes a side, a front, and a curved portion extending from the side to the front, the first airbag extending along the side and curving along the curved portion.

4. The airbag system of claim 3, wherein the first airbag includes a first end on the side of the seat bottom and a second end on the front of the seat bottom.

5. The airbag system of claim 4, further comprising a tether connected to the second end.

6. The airbag system of claim 5, wherein the first airbag defines an inflation chamber, and the tether is disposed in the inflation chamber.

7. The airbag system of claim 6, wherein the first airbag in the inflated position includes a curved portion at the second end, the curved portion has an outer corner at the second end, and the tether is connected to the outer corner.

8. The airbag system of claim 5, wherein the first airbag defines an inflation chamber, and the tether is disposed outside of the inflation chamber.

9. The airbag system of claim 8, wherein the first airbag in the inflated position includes a curved portion at the second end, the curved portion has an inner corner, and the tether is connected to the inner corner.

10. The airbag system of claim 1, further comprising a second airbag being inflatable to an inflated position, the seat bottom including a first side and a second side opposite the first side, the first airbag supported on the first side and the second airbag supported on the second side.

11. The airbag system of claim 10, further comprising an inflator in fluid communication with the first airbag and the second airbag.

12. The airbag system of claim 1, further comprising a second seat including a seat bottom, an airbag supported by the seat bottom of the second seat and being inflatable to an inflated position, the airbag of the second seat in the inflated position extending from the second seat to between the pair of front airbags in the inflated positions.

13. The airbag system of claim 12, wherein in the inflated positions the first airbag of the first seat abuts the airbag of the second seat, the first airbag of the first seat abuts one of the pair of front airbags, and the airbag of the second seat abuts the other of the pair of front airbags.

14. An airbag system comprising:
a first seat including a seat bottom;
an instrument panel;
a pair of front airbags supported by the instrument panel and being inflatable to inflated positions;
a first airbag supported by the seat bottom and being inflatable to an inflated position, the first airbag in the inflated position extending from the first seat to between the pair of front airbags in the inflated positions; and
a computer programmed to actuate inflation of the first airbag, the computer programmed to actuate inflation of at least one of the pair of front airbags at a predetermined amount of time after the actuation of the first airbag.

15. An airbag system comprising:
a first seat including a seat bottom;
an instrument panel;
a pair of front airbags supported by the instrument panel and being inflatable to inflated positions;
a first airbag supported by the seat bottom and being inflatable to an inflated position, the first airbag in the inflated position extending from the first seat to between the pair of front airbags in the inflated positions; and
a deflector supported by the seat bottom, the deflector configured to deflect the first airbag upwardly as the first airbag inflates.

16. The airbag system of claim 15, further comprising a hinge and a stop, the stop limiting a range of motion of the hinge, the deflector supported on the seat bottom with the hinge.

17. An airbag system comprising:
a first seat including a seat bottom;
an instrument panel;
a first airbag supported by the seat bottom and being inflatable to an inflated position; and
a pair of front airbags supported by the instrument panel and being inflatable to inflated positions;
the first airbag in the inflated position extending from the first seat to between the pair of front airbags in the inflated positions; and
a second airbag being inflatable to an inflated position, the seat bottom including a first side and a second side opposite the first side, the first airbag supported on the first side and the second airbag supported on the second side;
wherein the first airbag in the inflated position abuts at least one of the pair of front airbags in the inflated positions; and
wherein the first airbag and the second airbag in the inflated positions each have a distal end spaced upwardly from the seat bottom, and wherein a distance from the seat bottom to the distal end of the first airbag is greater than a distance from the seat bottom to the distal end of the second airbag.

18. An airbag system comprising:
a first seat including a seat bottom and a seat back;
an instrument panel;
a first airbag supported by the seat bottom and being inflatable to an inflated position; and a pair of front airbags supported by the instrument panel and being inflatable to inflated positions; and the first airbag in the inflated position extending from the first seat to between the pair of front airbags in the inflated positions;

wherein the first airbag in the inflated position abuts at least one of the pair of front airbags in the inflated positions; and wherein the first airbag in the inflated position abuts the seat back and the instrument panel.

* * * * *